(12) United States Patent
Bartek

(10) Patent No.: US 10,179,596 B2
(45) Date of Patent: Jan. 15, 2019

(54) RAIL WARNING SYSTEM AND METHOD

(71) Applicant: HARSCO TECHNOLOGIES LLC, Fairmont, MN (US)

(72) Inventor: Peter M. Bartek, Ledgewood, NJ (US)

(73) Assignee: HARSCO TECHNOLOGIES LLC, Fairmont, MN (US)

( * ) Notice: Subject to any disclaimer, the term of this patent is extended or adjusted under 35 U.S.C. 154(b) by 319 days.

(21) Appl. No.: 15/211,390

(22) Filed: Jul. 15, 2016

(65) Prior Publication Data

US 2017/0015336 A1   Jan. 19, 2017

Related U.S. Application Data

(60) Provisional application No. 62/197,913, filed on Jul. 28, 2015, provisional application No. 62/194,029, filed on Jul. 17, 2015.

(51) Int. Cl.
*B61L 23/06* (2006.01)
*H04B 1/3827* (2015.01)
(Continued)

(52) U.S. Cl.
CPC ............. *B61L 23/06* (2013.01); *G08B 5/006* (2013.01); *G08B 6/00* (2013.01); *G08G 1/005* (2013.01); *H04B 1/3827* (2013.01); *H04B 1/69* (2013.01); *B61L 1/02* (2013.01); *B61L 15/0027* (2013.01); *B61L 25/026* (2013.01); *H04B 2001/6912* (2013.01)

(58) Field of Classification Search
CPC ........ B61L 15/0027; B61L 1/02; B61L 23/06; B61L 25/026; B61L 23/34; B61L 29/24; B61L 15/0018; B61L 23/00; B61L 27/0094; B61L 29/00; G08B 5/006; G08B 6/00; G08G 1/005; H04B 1/3827; H04B 1/69; H04B 2001/6912
See application file for complete search history.

(56) References Cited

U.S. PATENT DOCUMENTS 5,265,831 A * 11/1993 Muller ...................... B61L 1/06
                                                              246/124
5,924,651 A *  7/1999 Penza ...................... B61L 23/06
                                                              246/124
(Continued)

FOREIGN PATENT DOCUMENTS

| JP | 10310058 | 11/1998 |
|---|---|---|
| JP | 2006224737 | 8/2006 |

OTHER PUBLICATIONS

International search report and written opinion of the international searching authority for co-pending PCT application No. PCT/US2016/042499 dated Oct. 24, 2016.

*Primary Examiner* — Mark T Le
(74) *Attorney, Agent, or Firm* — Baker & McKenzie LLP

(57) ABSTRACT

A rail warning system using wireless portable transmitters/receivers is described. The rail warning system uses a chirp spread spectrum modulation scheme, and alerts personnel in work zones on or near train tracks as well as optionally, on track equipment and train operators, of approaching trains or on track equipment. Portable wayside devices may also be positioned on the rail web, optionally magnetically, to alert work personnel, allowing for secure placement but also portability to other locations on the same track or adjacent tracks.

20 Claims, 4 Drawing Sheets

(51) Int. Cl.
*H04B 1/69* (2011.01)
*G08B 5/00* (2006.01)
*G08B 6/00* (2006.01)
*G08G 1/005* (2006.01)
*B61L 1/02* (2006.01)
*B61L 15/00* (2006.01)
*B61L 25/02* (2006.01)

(56) References Cited

U.S. PATENT DOCUMENTS

| | | | |
|---|---|---|---|
| 8,423,240 B2* | 4/2013 | Mian | B61L 1/165 |
| | | | 701/1 |
| 9,542,852 B2* | 1/2017 | Cross | G08G 9/00 |
| 2008/0231498 A1* | 9/2008 | Menzer | G01S 13/765 |
| | | | 342/134 |
| 2013/0166114 A1* | 6/2013 | Baines | B61L 23/06 |
| | | | 701/20 |
| 2015/0319725 A1* | 11/2015 | Marshall | H04W 56/0015 |
| | | | 370/350 |
| 2016/0280240 A1 | 9/2016 | Carlson et al. | |

* cited by examiner

RAIL WARNING SYSTEM AND METHOD

CROSS-REFERENCE TO RELATED APPLICATIONS

This application claims priority to U.S. Provisional Application No. 62/194,029, filed on Jul. 17, 2015, and U.S. Provisional Application No. 62/197,913, filed on Jul. 28, 2015, which are hereby incorporated by reference.

BACKGROUND

In the fields of freight rail, commuter rail, light rail, and heavy rail, it is important for a lookout, flagger, watchman or advance watchman to know the safe distance the flagger needs to be away from a work zone, work crews, or on track equipment. The flagger must safely alert work crews or railroad personnel on the tracks of an oncoming train or rail vehicle. Flaggers often rely on counting structures, which may result in an inaccurate distance from the work zone. In many instances, the counting method may result in the flagger being too far away from the work zone for workers to hear a warning.

Because working on rail tracks can involve activities such as digging, hammering, and other actions that produce loud noises, workers frequently cannot hear or see a flagger's alarm or visual warning of oncoming trains, and, consequently, may be in great danger of being struck by an on oncoming train. One current warning method employs flag men or whistle men who are positioned a distance away from the workers, such as 2,000 ft., 3,000 ft., or a distance related to the stopping distance of a train from a work crew, in both directions of the track. Such flag or whistle men signal with their flags and/or their whistles to warn of oncoming trains. Due to lack of worker attention or distracting ambient noise, work crews sometimes do not see the flag waving or hear the whistle blowing, and thus such conventional warning methods can be unreliable. In addition, previous and current methods do not provide a visual distance or alert to a train or on track equipment operator, or provide the train operator specific information regarding the type of railroad personnel ahead on or near the track. Further, previous and current methods do not provide early alert to track walkers, track work gangs, and track inspectors that a train is approaching.

BRIEF SUMMARY

In an example, a system for use on or near train tracks includes a first portable device and a second portable device. The first portable device is battery powered. The first portable device includes a first wireless transceiver operable to transmit and receive signals using a chirp spread spectrum modulation scheme. The second portable device is battery powered. The second portable device includes a second wireless transceiver device operable to transmit and receive signals using a chirp spread spectrum. At least one of the first and second portable devices is operable to determine a distance between the first and second portable devices using chirp spread spectrum modulation scheme pulses. At least one of the first and second portable devices is operable to cause an alert to personnel on or near train tracks if the determined distance is above a threshold distance.

In another example, a method of alerting personnel of an approaching train or on track equipment includes: providing first and second portable wireless devices disposed a distance from one another alongside train tracks and respectively carried by railroad personnel; determining a distance between the first and second wireless portable devices using chirp spread spectrum modulation scheme pulses; and alerting personnel on or near train tracks of the presence of an approaching train or on track equipment.

BRIEF DESCRIPTION OF THE DRAWINGS

Exemplary embodiments of the present disclosure are described herein with reference to the drawings, wherein like parts are designated by like reference numbers, and wherein.

DETAILED DESCRIPTION

Various embodiments of a rail warning system and methods of using a rail warning system according to the present disclosure are described. It is to be understood, however, that the following explanation is merely exemplary in describing the devices and methods of the present disclosure. Accordingly, several modifications, changes, and substitutions are contemplated.

Improvements to existing rail warning systems are needed, and one aspect of the present disclosure is a rail warning system wherein a lookout, flagger, watchman or advance watchman uses a hand-held, portable device to give an advance warning to work crews or work zones of dangers, such as an on track vehicle or train approaching. Such an application allows the flagger to protect workers, including those operating in work zones. Another advantage of the rail warning system described herein is that it determines the distance the flagger is from the work zone, which allows the flagger to stay within a safe visual working distance from the work zone and on track equipment. If the safe distance is exceeded, the flagger will receive a visual and audible alarm. A further aspect of the present disclosure is that the rail warning system will provide rail vehicle operators a display of specific railroad personnel on or near the tracks, and in a further embodiment, will give the rail vehicle operator early warning of a work crew or work gang ahead.

Another advantage of the rail warning system according to the present disclosure is that the flagger knows the distance, for instance +/−1 meters, from the workers or work crews. In another aspect, a safe distance can be set in the system depending on weather conditions, such as for example, about 1000 to 3000 feet. Further, the system may be used in outside and inside environments. In another aspect, alarms will be triggered if distances are exceeded, alerting workers and work zones of approaching danger, such as a train or on track vehicle or work equipment. In a further aspect of the disclosure, communication and distance measurements are transmitted wirelessly between human assets, mobile assets, and wayside assets within or near a work zone.

Figure 1:
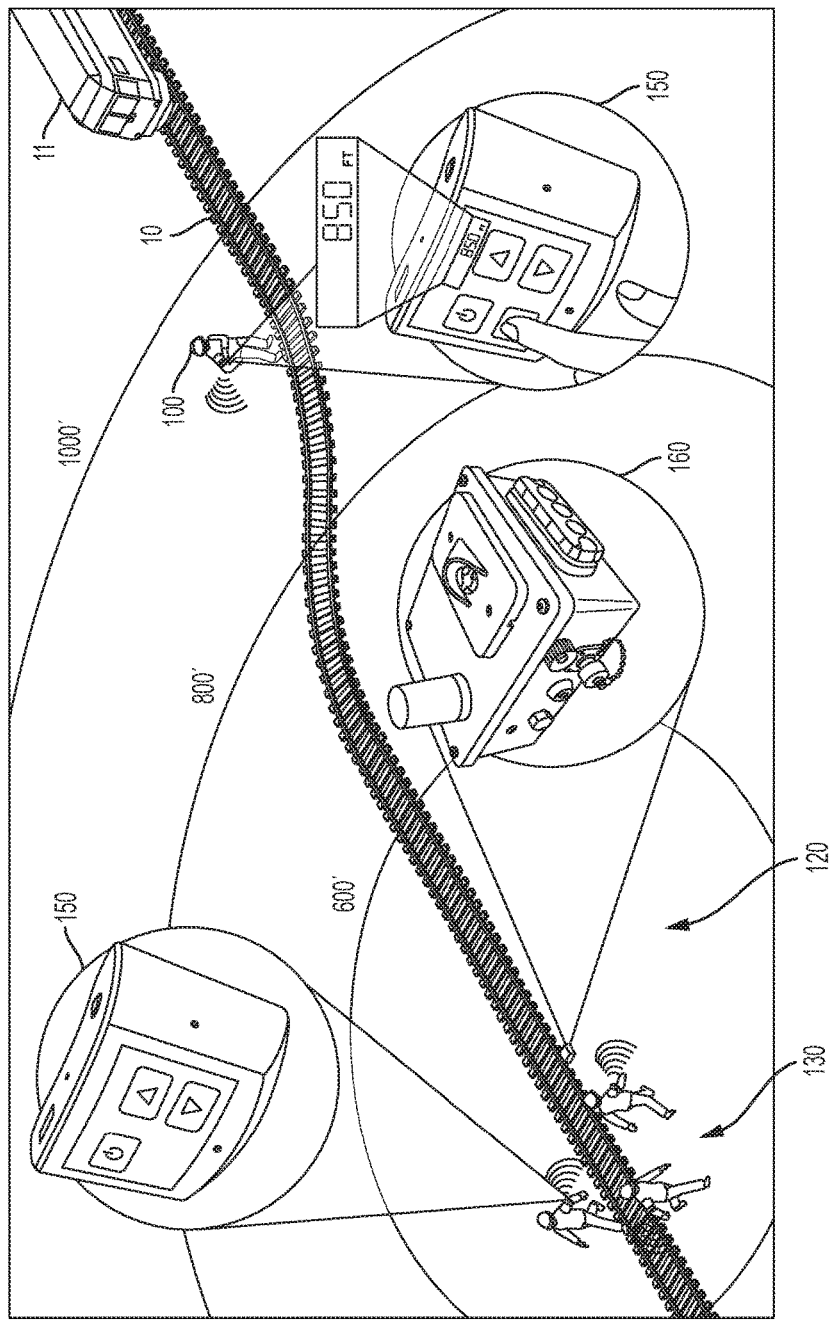
FIG. 1 illustrates a perspective view of train tracks and work personnel, wherein a flagger is moving into a safe position from the work zone with the wireless rail warning system ranging the distance by communicating with a portable wayside device and/or personal transmitter/receivers, according to one embodiment of the present disclosure.
Figure 2:
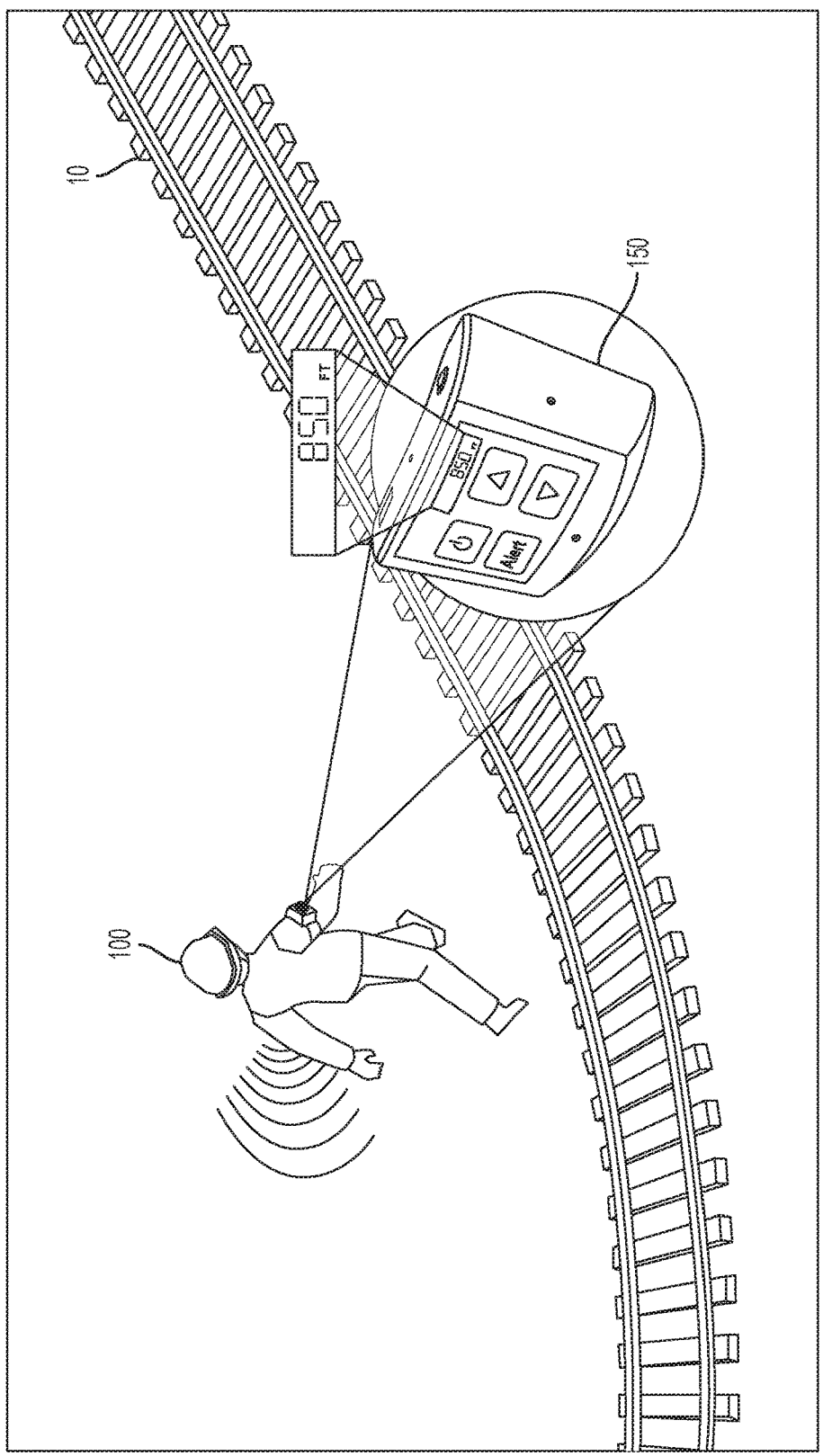
FIG. 2 illustrates a perspective view wherein a flagger sets a distance from the work zone, which sends a wireless signal to warning system at the work zone and/or wireless system on the train to alert of the approaching train, according to one embodiment of the present disclosure.
Figure 3:
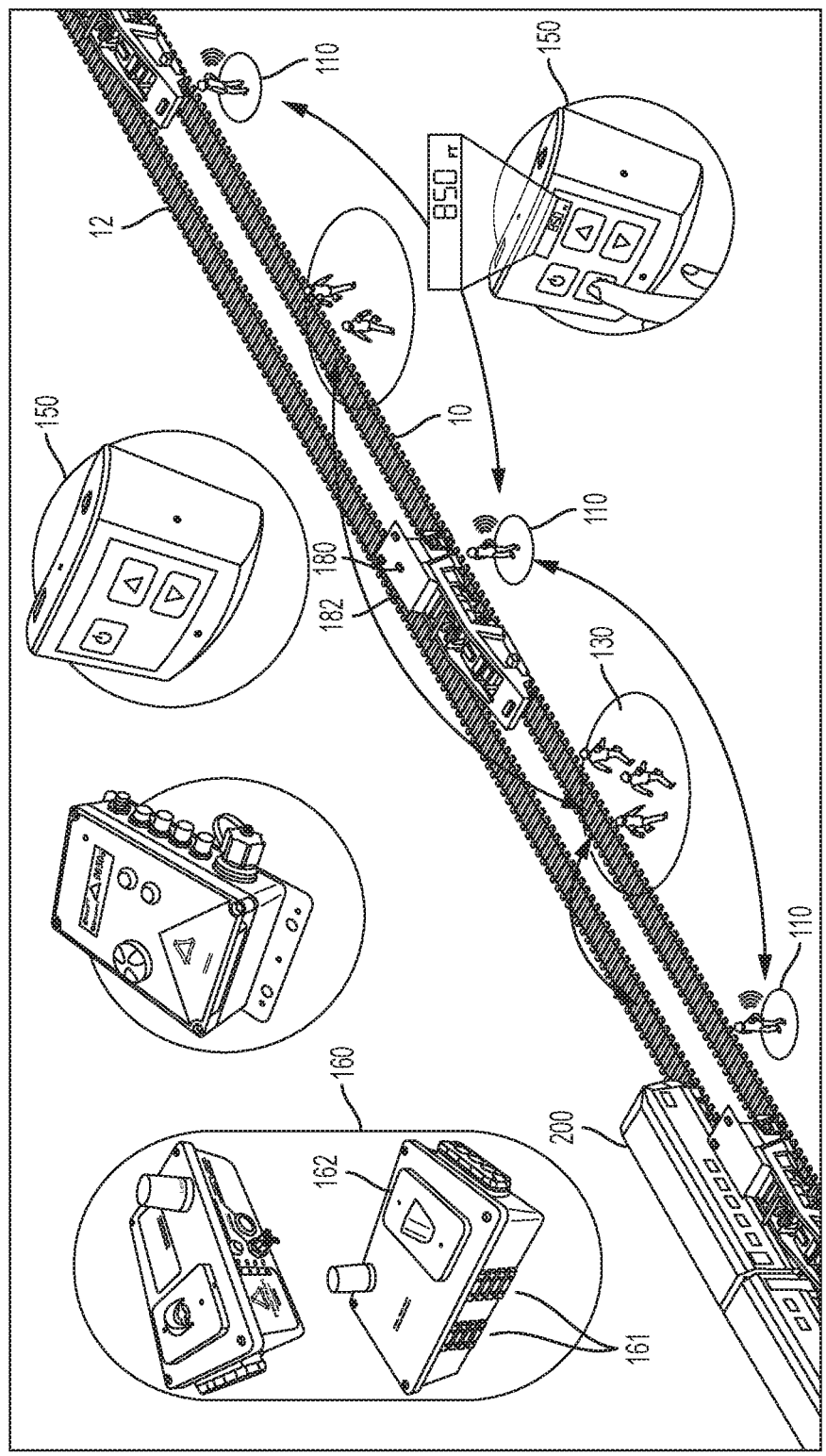
FIG. 3 illustrates a perspective view of the rail warning system, wherein a series of flaggers are positioned proximate work zones along a work track, which is disposed adjacent a live track, according to one embodiment of the present disclosure.

Referring to FIGS. 1-3, embodiments of the rail warning system 2 can be used on or near railroad tracks having a train 11, tracks 10, a flagger 100, a work zone 120 and a work gang 130. The work zone 120 may be a fixed or moving work zone. Although not depicted, other personnel, including a train operator, a watchman, advance watchmen, a trackwalker and other railroad workers and personnel may be present in the vicinity of the rail warning system described herein. In one embodiment, the rail warning system 2 according to the present disclosure uses an electronic wireless distance measurement to warn rail workers, such as the work gang 130, of an oncoming train. For example, the electronic wireless distance measurement may be made using an estimated chirp spread spectrum approach, a modulated 900 MHz spread spectrum approach and/or 2.4 GHz chirp spread spectrum wireless nodes. In a spread spectrum mode, transmitting and receiving can be done in multiple channel bands, thus assuring a high probability that the signal is sent and received. For example, in the 900 MHz context, transmitting and receiving may occur between bands 902-928, or a multiple of such bands. In this manner, if a particular channel band is in use, the signal may pass through another channel band or multiple channel bands.

The estimated chirp spread spectrum approach may include a time of arrival estimation or other ranging techniques. Accordingly, the system according to the present disclosure is capable of wirelessly measuring and alerting a flagger 100, a watchman, and/or an advance watchman regarding a safe distance from the flagger to the beginning of a work zone 120 containing work gangs 130 or other railroad personnel or to the work gangs themselves. In this manner, the flagger 100 is able to stay a safe distance from the railroad workers 130 such that the flagger has sufficient time to alert the railroad workers as to the presence of an oncoming train 11 or other rail vehicle. Another aspect is that the system 2 can alert track workers, track work gangs, as well as on track equipment operators and train operators.

In one embodiment, the system 2 includes a plurality of transmitter/receiver devices 150 that are operable to communicate with one another to provide for worker safety in rail operations. The transmitter/receiver devices 150 may be used as personal devices (carried by the users such as the flagger 100 and the railroad workers 130), portable wayside devices 160 and vehicle mounted devices. The personal devices may be small in size and battery powered such that they may be easily carried by railroad personnel. Portable wayside transmitter/receiver devices 160 are optionally magnetically mounted to rail. The personal transmitter/receivers 150 for positioning are preferably wireless and battery-operated and may be located on or in the possession of one or more of the railroad flaggers 100 and the track workers 130. It will be appreciated that a device that is capable of transmitting and receiving signals may also be referred to as a transceiver.

In one embodiment, the personal transmitter/receivers 150 may operate on a 900 MHz spread spectrum and/or 2 a 4 GHz spread spectrum, either of which may use a chirp spread spectrum technique, for transmitting and receiving signals. The personal transmitter/receivers 150, for example through these transmission techniques, may be capable of indicating the presence of an oncoming train or on track equipment at a high degree of accuracy such as an accuracy of 1 meter at a distance of up to 2500 feet. Of course, other distance ranges are contemplated. The personal transmitter/receivers 150 carried by the flagger(s) 100 are capable of causing a perceptible indication to be provided to the railroad workers 130 that indicates the presence of an oncoming train 11 or on track equipment, for instance via sending a signal to one or more portable wayside devices 160 (e.g., having warning horn and/or light) or directly to the personal transmitter/receiver devices carried by the railroad workers (e.g., having a warning horn, light and/or haptic actuator). The personal transmitter/receivers 150 carried by the flagger(s) 100 can also transmit a warning signal to the train or on track equipment operators to indicate the presence of the track workers 130 present on or near railroad tracks.

An embodiment of the system 2 may be configured to communicate with multiple wireless personal transmitter/receivers 150 to determine distance using ranging (e.g., time of arrival (TOA)) estimation based on chirp spread spectrum modulation scheme pulses for communication. For example, the transmitter/receiver device 150 carried by the flagger may communicate with one or more transmitter/receiver devices carried by the railroad workers 130 to determine the distance between the flagger and one or more railroad workers such as by the described TOA estimation. The distance measurement may be displayed on the transmitter/receiver devices 150. By measuring the distance, the transmitter/receiver 150 carried by the flagger 100 may generate a visual and audible alarm if the measured distance is more than a given threshold. This alerts the flagger 100 that he or she has gone beyond a safe distance from the work zone 120. Alternatively, the flagger 100 upon noticing that distance has exceeded a certain threshold may depress an alert button, which generates a visual and audible alarm to the various personal transmitter/receivers 150.

In a further aspect, the multiple wireless personal transmitter/receivers 150 may be configured to communicate with the magnetically mounted wireless portable wayside device transmitter/receivers 160. The personal transmitter/receivers 150 and portable wayside devices 160 may determine distance between rail workers 130 and flagger(s) 100 using a ranging estimation based on chirp spread spectrum modulation scheme pulses for communication. In doing so, the system of multiple wireless personal transmitter/receivers 150 may be configured to generate a visual and/or audible alarm if the distance, as calculated through communication with the portable wayside devices 160, between the multiple personal transmitter/receiver units is more than a set threshold. In such embodiments, the distance between the rail workers 130 and the flagger(s) 100 may be displayed on the transmitter/receiver units 150.

In another embodiment, the multiple wireless personal transmitter/receivers 150 may be configured to communicate with multiple vehicle mounted transmitter/receivers 180 mounted on work vehicles 182. The personal transmitter/receivers 150 and vehicle mounted transmitter/receivers 180 may determine distance between rail workers 130 and flagger(s) 100 using ranging estimation based on chirp spread spectrum modulation scheme pulses for communication. In doing so, the system of multiple wireless personal transmitter/receivers 150 may be configured to generate a visual and/or audible alarm if the distance between the multiple personal transmitter/receiver units are more than a set threshold. In such embodiments, the distance between the rail workers 130 and the flagger(s) 100 may be displayed on the multiple personal transmitter/receiver units 150.

Further, the distance between vehicle mounted transmitter/receivers 180 may also be measured, and thus alarms may be triggered for the rail workers 130 and/or flagger(s) 100 when the distance between vehicle mounted transmitter/receivers exceeds a given threshold. Still further, the vehicle mounted transmitters/receivers 180 may include a display for displaying the distance the rail vehicle is from the work zone 120. In this manner, the operator of the rail vehicle is aware of the location of the rail vehicle relative to work crew 130.

In yet another embodiment, the magnetically mounted wireless portable wayside device transmitter/receivers 160 may monitor the distance of the vehicle mounted transmitter/receivers 180 using ranging estimation based on chirp spread spectrum modulation scheme pulses for communication. For example, the wayside devices 160 may be configured to measure the distance between one or more of the vehicle mounted transmitter/receivers 180 and the end of the work zone 120. In this manner, should a particular rail vehicle pass beyond its work zone, the wayside device 160 may alert the rail vehicle operator via the vehicle-mounted transmitter/receiver 180 that it is leaving the work zone. In addition, the wayside device 160 may alert the work crew 130 that a particular rail vehicle has left its work zone and may be headed towards the workers. Still further, the wayside devices 160 may be configured to measure the distance between particular vehicle mounted transmitter/receivers 180 and provide alerts should such vehicles come within a certain distance of one another. Such alerts and communications may be provided with chirp spread spectrum modulation scheme pulses. Further, the alerts may be provided through a visual and/or audible alarm for the work crew 130 and operators of the rail vehicles.

Figure 4:
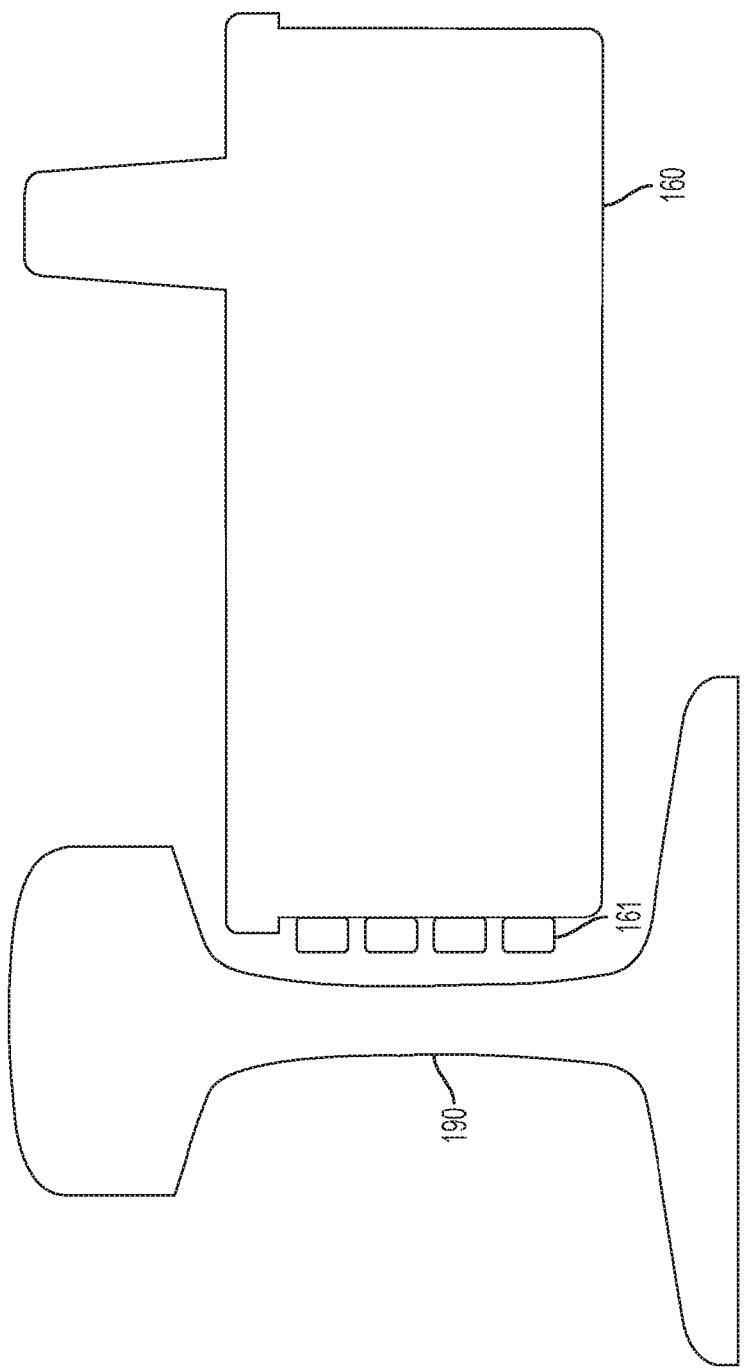
FIG. 4 illustrates a wayside device that may be magnetically mounted to a rail.

In another aspect, and with reference to FIG. 4, the multiple magnetically mounted wireless portable wayside devices may be configured with multiple mounting magnets 161 on one side which allow, the multiple magnetically mounted wireless portable wayside devices to mount to a running rail or rail web 190. Such a configuration may allow for a common communication plane and/or a secure method of mounting while still being portable and readily movable from one rail to another for on track warning and adjacent track warning. The portable wayside device 160 is particularly useful when used with moving work zones.

Referring back to FIG. 3, the wayside devices 160 may be deployed in an adjacent track arrangement, whereby sets of railroad tracks are in close proximity to one another. In such arrangements, one track may be live while an adjacent track is being worked on by work crew 130. In the embodiment shown in FIG. 3, the worked track is illustrated as track 10 and the live track is illustrated as track 12. Trains passing on the live track, such as train 200, thus present a hazard to the work crew 130. Accordingly, one or more wayside devices 160 may be placed along the live track at a distance from the work zone on the adjacent track. The wayside devices 160 may include a sensor 162, which is able to sense a passing train. Upon sensing a passing train on the live track 12, the wayside device 160 is configured to communicate with the transmitters/receivers 150 carried by the work crew 130 on the adjacent track to alert the crew that a train is approaching on the live track. Such communication may take place using chirp spread spectrum modulation scheme pulses.

The trains 11, 200 may be equipped with collision avoidance systems that are able to wirelessly communicate with the rail warning system 2. For example, the trains may send warning signals to the rail warning system 2 via chirp spread spectrum modulation scheme pulses. This is advantageous as precise distances can be conveyed to the flagger 100 and/or rail workers 130, thus providing sufficient time for such rail personnel to safely back away from the track.

While various embodiments in accordance with the disclosed principles have been described above, it should be understood that they have been presented by way of example only, and are not limiting. For example, while exemplary specific ranges of have been provided, such ranges are exemplary. Thus, the breadth and scope of the invention(s) should not be limited by any of the above-described exemplary embodiments, but should be defined only in accordance with the claims and their equivalents issuing from this disclosure. Furthermore, the above advantages and features are provided in described embodiments, but shall not limit the application of such issued claims to processes and structures accomplishing any or all of the above advantages.

What is claimed is:

1. A system for use on or near train tracks, comprising:
a first portable device that is battery powered, the first portable device including a first wireless transceiver operable to transmit and receive signals using a chirp spread spectrum modulation scheme;
a second portable device that is battery powered, the second portable device including a second wireless transceiver device operable to transmit and receive signals using a chirp spread spectrum, wherein
at least one of the first and second portable devices is operable to determine a distance between the first and second portable devices using chirp spread spectrum modulation scheme pulses, and
at least one of the first and second portable devices is operable to cause an alert to personnel on or near train tracks if the determined distance is above a threshold distance.

2. The system of claim 1, wherein the chirp spread spectrum modulation scheme pulse includes a 900 MHz spread spectrum scheme or a 2.4 GHz chirp spread spectrum scheme.

3. The system of claim 1, wherein the alert is automatically generated if the distance between the first and second portable devices is more than a predetermined threshold.

4. The system of claim 3, wherein the alert is at least one of visible, audible and haptic.

5. The system of claim 1, wherein at least one of the first and second portable devices is operable to communicate with at least one magnetically mounted wireless portable wayside device.

6. The system of claim 5, wherein the at least one magnetically mounted portable wayside device is operable to communicate wirelessly with at least one of the first and second portable devices.

7. The system of claim 6, wherein at least one of the first and second portable devices is operable to display a distance to the at least one magnetically mountable portable wayside device.

8. The system of claim 6, wherein the at least one magnetically mounted portable wayside device is operable to mount to a rail of a track.

9. The system of claim 1, further comprising at least one vehicle mounted device that operable to communicate wirelessly with at least one of the first and second portable devices.

10. The system of claim 9, further comprising at least one magnetically mounted wireless portable wayside device that is operable to communicate wirelessly with the at least one vehicle mounted device and the first and second portable devices.

11. The system of claim 10, wherein at least one of the first and second portable devices is operable to display a distance to the at least one magnetically mountable portable wayside device.

12. The system of claim 10, wherein at least one of the first and second portable devices is operable to display a distance to the at least one vehicle mounted device.

13. A method of alerting personnel of an approaching train or on track equipment, the method comprising:
providing first and second portable wireless devices disposed a distance from one another alongside train tracks and respectively carried by railroad personnel;
determining a distance between the first and second wireless portable devices using chirp spread spectrum modulation scheme pulses; and
alerting personnel on or near train tracks of the presence of an approaching train or on track equipment.

14. The method according to claim 13, wherein the distance is determined using chirp spread spectrum modulation scheme pulses including a 900 MHz spread spectrum scheme or a 2.4 GHz chirp spread spectrum scheme.

15. The method according to claim 13, wherein the alerting personnel includes depressing a button on the first portable wireless device to cause an audible, visual, or haptic alert to generate on the second portable wireless devices.

16. The method according to claim 13, further comprising facilitating communication between the first and second portable wireless devices using at least one mountable wireless portable wayside device.

17. The method according to claim 16, further comprising magnetically mounting the at least one portable wayside device to a rail of the train tracks.

18. The method according to claim 13, further comprising automatically generating an audible, visual or haptic alert if the distance between the first and second portable wireless devices is more than a threshold.

19. The method according to claim 16, wherein the magnetically mounted device is portable, such that it can be moved to another track for on track warning and or adjacent track warning.

20. The method according to claim 13, further comprising facilitating communication between the first and second portable wireless devices using at least one vehicle mounted transceiver.

* * * * *